Patented Oct. 3, 1922.

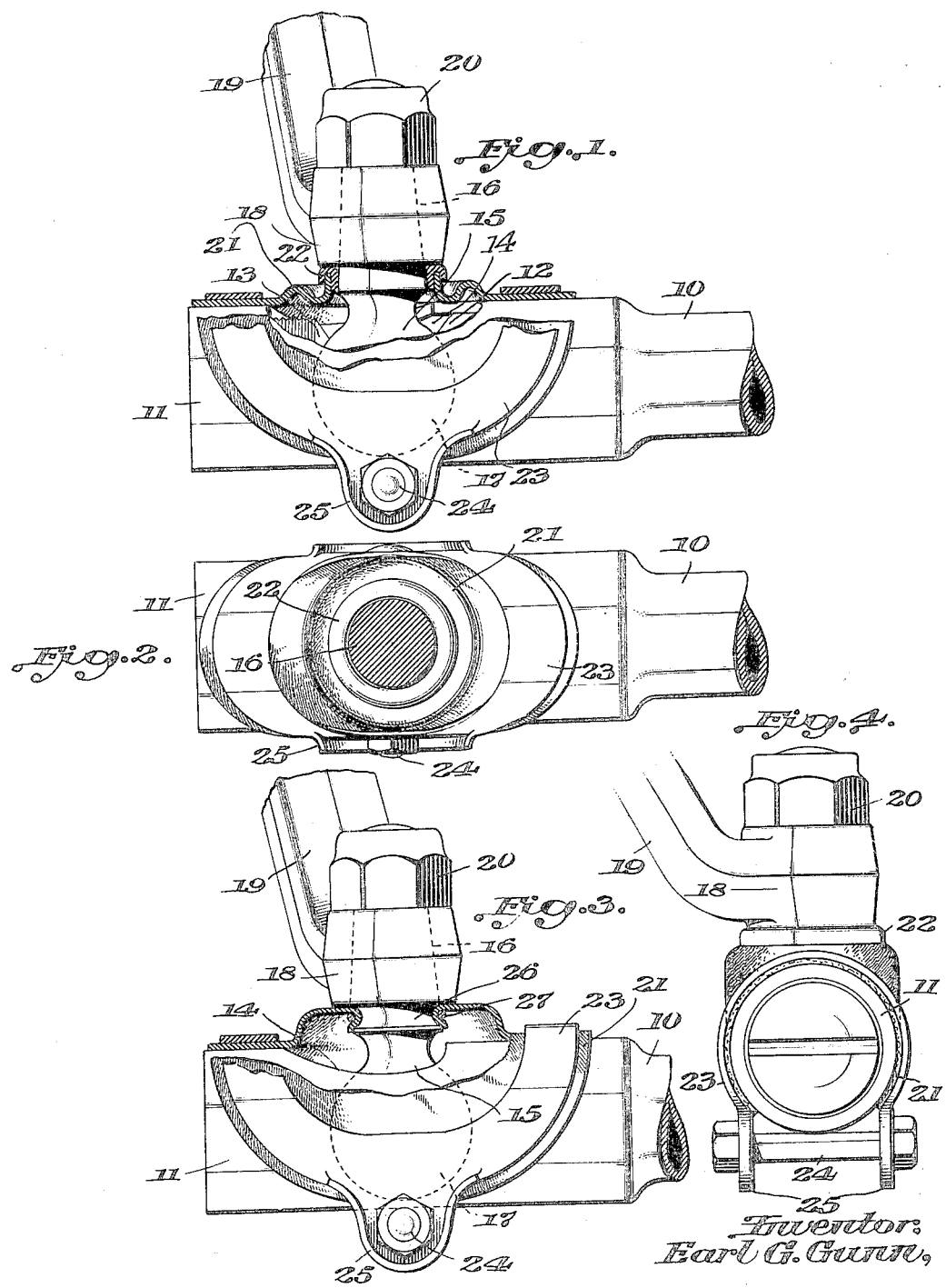

1,431,112

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 1, 1919. Serial No. 327,672.

*To all whom it may concern:*

Be it known that I, EARL G. GUNN, a citizen of the United States, and resident of Detroit, Wayne County, State of Michigan, have invented certain new and useful Improvements in Motor Vehicles, of which the following is a specification.

This invention relates to motor vehicles and more particularly to closures for the exposed joints of motor vehicles, such as the joints of the steering mechanism.

The exposed joints between the movable elements of a motor vehicle such as the universal or ball and socket joints of the steering mechanism soon become filled with dust and dirt during the operation of the vehicle and thereby become gritty, stiff and practically inoperative.

With this problem in mind, the present invention has for its object to provide an efficient closure for the exposed joints of motor vehicles and machines of like character and a closure that will not in any way interfere with the efficient operation of the joint and which may be easily and quickly attached to and detached from the joint.

A further object is to provide a flexible closure and means for securely retaining the closure in place.

Still further objects will appear as the description proceeds.

The above objects are attained by the construction shown in the drawing; this construction being illustrated in connection with the ball and socket joint of the steering mechanism and embodying means for securing a flexible closure to one member of the joint and a clip for securing the closure to the other member of the joint, this clip, in the embodiment illustrated, being shown as resilient and surrounding the first member of the joint.

Certain specific embodiments of the invention have been illustrated in the drawing, and in the drawing:

Fig. 1 is a side elevation partly broken away and illustrating my improved closure in section, Fig. 2 is a transverse sectional view of the construction shown in Fig. 1, Fig. 3 is a view similar to Fig. 1 but showing a modified form of the construction, and Fig. 4 is an end elevation of the construction shown in Figures 1 and 2.

In illustrating my invention, I have shown the improved closure in connection with a universal joint between the steering cross tube of a motor vehicle and the steering knuckle lever, the cross tube being illustrated at 10 and being provided at its end with a tubular casing 11, having a pair of spherical bearing members 12 and 13 secured therein in any suitable manner.

An opening 14 is formed in what may be termed the upper surface of the casing 11 and this opening receives a ball joint member 15, having a tapered shank portion 16 formed on one end and a ball 17 formed on the other end, the ball 17 being adapted to be received between the spherical bearing members 12 and 13. The tapered shank 16 of the ball joint member has secured thereto a tapered head 18 of the steering knuckle arm 19, a nut 20, having a screw threaded connection with the upper end of the shank 16, securely retaining the head 18 on the shank 16.

The means for closing the opening 14 in the casing 11 comprises a closure member 21, which is preferably formed of leather or other suitable flexible material and means for securing the member 21 to the shank portion of the ball joint member and to the tubular casing 11 of the cross tube 10.

In the embodiment of the invention illustrated in Figures 1 and 2, a ferrule 22 is secured to the closure 21, this ferrule being provided with an annular channel adapted to receive the member 21, this latter member being secured in the channel in any suitable manner. The ferrule 22 is positioned over the tapered shank portion 16 of the ball joint member and this ferrule is made of such dimensions that it will fit tightly over the lower portion of the tapered shank 16 and be securely held thereon as the head 18 is secured to the shank portion by means of the nut 20.

The means for securing the closure 21 to the casing 11 comprises a clip 23 preferably made of resilient material and being formed in the general shape of a saddle. The saddle clip 23 is adapted to fit over the casing 11 and to surround the shank 16 and means is provided for securing this clip to the casing, this securing means comprising a bolt 24 which engages oppositely disposed downwardly extending portions or ears 25 formed on the clip. The apertures in these downwardly extended portions are so positioned that the bolt 24 which passes through the aperture will engage the lower surface of the casing 11 thereby securing the clip against vertical displacement.

In Fig. 3 I have illustrated a modified form of the invention, the only difference between this construction and that shown in Figure 1 residing in the means for securing the closure to the shank portion 16. The shank 16 in Figure 3 is provided with an annular groove 26 adjacent its lower end and the closure is secured in this groove by means of a split ring 27 formed of resilient material.

The construction of the clip for securing the closure, shown in Fig. 3, to the casing 11 is exactly similar to that above described.

From the above description it will be seen that simple and efficient means has been provided for closing the joint between the movable elements such as the cross tube and steering knuckle lever of a motor vehicle steering mechanism, this closure being securely retained on the cooperating elements.

Attention is called to the fact that this type of closure may be easily and quickly attached to the cooperating elements, it being merely necessary in the construction shown in Figure 1 to place the ferrule 22 over the shank 16 and to place the clip 23 over the outer portion of the closure whereupon this clip may be secured in place by means of a single retaining bolt 24.

While I have in the above specification described certain embodiments of the invention, it should be understood that the invention is capable of further modification and that modifications and changes may be made in the construction and arrangement of the cooperating parts without departing from the spirit and scope of the invention, as expressed in the following claims.

What I claim and desire to secure by Letters Patent is:

1. A shield for preventing the entrance of dust and grit into the joint between two metallic members the first of which has an end pivotally retained within a socket formed in the second, comprising a closure sheet of flexible material having an aperture to receive the first mentioned member, and means for securing the closure to the second member with dust tight fit along a line completely encircling the first member, the closure having sufficient material loosely arranged between the aperture and the line of contact with the second member to accommodate itself without stretching to all movements of the first member relatively to the second.

2. A shield for preventing the entrance of dust and grit into the joint between two metallic members the first of which has an end pivotally retained within a socket formed in the second, comprising a closure sheet of flexible material having an aperture to receive the first mentioned member, means associated with the margin of said aperture for preventing the passage of dust between the closure and said first member, and means for securing the closure to the second member with dust tight fit along a line completely encircling the first member, the sheet having sufficient material loosely arranged between the aperture and the line of contact with the second member to accommodate itself without stretching to the movements of the first member relatively to the second.

3. A shield for preventing the entrance of dust and grit into the joint between two metallic members the first of which has an end pivotally retained within a socket formed in the second, comprising a closure sheet of flexible material having an aperture to receive the first mentioned member, an annular member associated with the margin of said aperture for preventing the passage of dust between the closure sheet and said first member, and means for securing the closure to the second member with dust tight fit along a line completely encircling the first member, the closure sheet having sufficient material loosely arranged between the aperture and the line of contact with the second member to accommodate itself without stretching to the movements of the first member relatively to the second.

4. The combination with two metallic members the first of which has an end pivotally retained within a socket formed in the second, of a device for preventing the entrance of dust and grit into the joint between said members comprising, a closure sheet of flexible material having an aperture to receive the first mentioned member, and a saddle-shaped clip for securing the closure to the second member, with dust tight fit, along a line completely encircling the first member, the closure having sufficient material loosely arranged between the aperture and the line of contact with the second member to accommodate itself without stretching to all movements of the first member relatively to the second.

5. The combination with two metallic members the first of which has an end pivotally retained within a socket formed in the second, of a device for preventing the entrance of dust and grit into the joint between said members comprising a closure sheet of flexible material having an aperture to receive the first mentioned member, an annular saddle shaped clip for securing the closure to the second member with dust tight fit, along a line completely encircling the first member, and a single bolt engaging spaced portions of the clip and engaging said second member, for securing said clip rigidly in position, the closure having sufficient material loosely arranged between the aperture and the line of contact with the second member to accommodate itself without stretching to all movements of the first member relatively to the second.

6. In combination, a member having an opening therein, second member jointed to said first named member and having a tapered shank portion extending through said opening, a closure for said opening and a ferrule secured to said closure and positioned on said tapered shank portion for securing said closure to said shank portion and means for securing said closure to said first named member.

In testimony whereof I affix my signature.

EARL G. GUNN.